US005565130A

United States Patent [19]

Omeis et al.

[11] Patent Number: 5,565,130

[45] Date of Patent: Oct. 15, 1996

[54] COMB POLYMERS BASED ON OLEFIN COPOLYMER MACROMONOMERS

[75] Inventors: Jürgen Omeis, Bickenbach; Horst Pennewiss, Darmstadt, both of Germany

[73] Assignee: Rohm GmbH Chemische Fabrik, Darmstadt, Germany

[21] Appl. No.: 478,048

[22] Filed: Jun. 7, 1995

Related U.S. Application Data

[63] Continuation of Ser. No. 227,344, Apr. 14, 1994, abandoned.

[30] Foreign Application Priority Data

Apr. 20, 1993 [DE] Germany .......................... 43 12 715.0

[51] Int. Cl.[6] .................................................. C10M 145/14

[52] U.S. Cl. .......................... 508/469; 525/302; 525/307; 560/190; 560/196; 508/262; 508/268; 508/470

[58] Field of Search .......................... 252/56 R; 525/307, 525/302

[56] References Cited

U.S. PATENT DOCUMENTS

| | | | |
|---|---|---|---|
| 4,085,168 | 4/1978 | Milkovich et al. | 260/886 |
| 4,867,894 | 9/1989 | Pennewiss et al. | 252/56 R |
| 5,015,406 | 5/1991 | Le | 252/56 R |
| 5,043,087 | 8/1991 | Pennewiss et al. | 252/56 R |
| 5,098,975 | 3/1992 | Omelis et al. | 526/312 |
| 5,254,632 | 10/1993 | Kerscher et al. | 525/309 |
| 5,272,211 | 12/1993 | Sutherland et al. | 525/302 |
| 5,349,019 | 9/1994 | Wirtz et al. | 252/56 R |

FOREIGN PATENT DOCUMENTS

| | | |
|---|---|---|
| 0431706 | 6/1991 | European Pat. Off. . |
| 1053529 | 1/1967 | United Kingdom . |

*Primary Examiner*—Ellen M. McAvoy

*Attorney, Agent, or Firm*—Oblon, Spivak, McClelland, Maier, & Neustadt, P.C.

[57] ABSTRACT

The invention relates to comb polymers based on olefin copolymer macromonomers. Preferred comb polymers are copolymers of optionally hydrogenated olefin copolymer macromonomers of formula I $$R_1-[A]_n-[A']_m-CH_2CH_2-O-\overset{\overset{\large O}{\|}}{C}-\overset{\overset{\large R'}{|}}{C}=CH_2 \qquad (I)$$

wherein

R' is hydrogen or methyl $R_1$ is the organic residue of a lithium-organic compound,

[A] is a segment formed by 1,4-addition of butadiene potentially substituted with a C1–C6 alkyl residue

[A'] is a segment formed by vinyl addition of butadiene potentially substituted with a C1–C6 alkyl residue and n+m stands for an integer of from 7 to 3,000, with (meth)acrylic ester monomers of formula II $$CH_2=\overset{\overset{\large R'}{|}}{C}-\overset{\overset{\large O}{\|}}{C}-OR_2 \qquad (II)$$

wherein

R' is hydrogen or methyl, and $R_2$ is an alkyl residue with 1 to 26 carbon atoms.

7 Claims, No Drawings

COMB POLYMERS BASED ON OLEFIN COPOLYMER MACROMONOMERS

This application is a Continuation of application Ser. No. 08/227,344, filed on Apr. 14, 1994, now abandoned.

BACKGROUND OF THE INVENTION

The invention relates to comb polymers based on olefin copolymer macromonomers. These comb polymers are useful as oil additives. This application is based on German Application P4312715.0, filed Apr. 20, 1993, incorporated herein by reference.

DISCUSSION OF THE BACKGROUND

The viscosities of polymer solutions, particularly of polymers in mineral oils, typically depend to a high degree on the molecular weight and molecular weight distribution of the polymer. The thickening effect ($\eta_{ref}$=relative viscosity) and its dependence on temperature (coil contraction) generally increase together with increasing molecular weight. See Rheological Properties of Lubricants, J. Briant, J. Denis, G. Parc, Ed., Editions Technip., Paris 1989) incorporated herein by reference.

Parallel to this, the shear stability, i.e. chain breakage, precipitously decreases with increasing molecular weight. Due to these opposing effects, shear-stable viscosity index improvers, such as the ones popular for gear, hydraulic and other motor oil applications can only be realized with very large amounts of additives.

Polyalkyl(meth)acrylates, (PAMAs), when used as oil additives bring about, with a specific dependence on molecular weight and monomer composition, an increase in the viscosity index and provide low temperature properties which are excellent as compared to other viscosity index improvers. The basic precondition for their use as oil additives is, in each case, the oil solubility of the polymer. In the case of polyalkyl(meth)acrylates, the oil solubility is based on the presence of a sufficiently high number of ester alkyl side chains, usually with $C \geqq 10$.

To increase the viscosity index of polyalkylmethacrylates, short-chain (meth)acrylates have been used, e.g., methylmethacrylate or butylmethacrylate. Since the short-chain components reduce the solubility of the PAMA at low temperatures, the methylmethacrylate content is limited to approximately 20% by weight. Depending on shear stability and the base oil, the viscosity indices range between 150 and 250, based on a molecular weight range with a corresponding shear stability index (SSI) of up to 20.

Of particular technical interest in the art are viscosity index improvers which contribute only minimally to overall viscosity at low temperatures and provide normal thickening at 40° to 100° C. with simultaneous good oil solubility in the low temperature range. Such viscosity index improvers would make it possible to use higher-viscosity base oils with a correspondingly lower evaporation loss at higher temperatures.

SUMMARY OF THE INVENTION

Accordingly, one object of the invention is to provide a novel polymer oil additive that provides the properties described above. Other objects will become apparent as the invention becomes better understood by reference to the following detailed description.

DETAILED DESCRIPTION

It has now been discovered that desired oil additive properties are provided by comb polymers produced by the copolymerization of alkyl(meth)acrylates with macromonomers of the olefin-copolymer (OCP) type. The invention thus relates in particular to comb polymers produced by radical copolymerization of alkyl(meth)acrylates with olefin-copolymer macromonomers and oil compositions containing these additives. Radical copolymerization and anionic copolymerization techniques are preferred.

Preferred OCP macromonomers according to the invention. have the following formula I $$R_1-[A]_n-[A']_m-CH_2CH_2-O-\overset{O}{\overset{\|}{C}}-\overset{R'}{\overset{|}{C}}=CH_2 \qquad (I)$$

wherein

R' is hydrogen or methyl $R_1$ is an organic residue of a lithium-organic compound,

[A] is a segment formed by the 1,4-addition of butadiene which is optionally substituted with a C1–C6 alkyl residue, or is a segment formed by the vinyl addition of styrene or a $C_1$–$C_6$ alkyl styrene

[A'] is a segment formed by the vinyl addition of butadiene which is optionally substituted with a C1–C6 alkyl residue, or is a segment formed by the vinyl addition styrene or a $C_1$–$C_6$ alkyl styrene n and m each independently are an integer of from 0 to 3,000 and n+m=7 to 3000.

$R_1$, as will be shown below, stems from a lithium-organic catalyst used in anionic polymerization to provide compounds of formula I and preferably stands for an alkyl or aryl residue with 1 to 6 carbon atoms, preferably a linear or branched butyl residue, more preferably an n-butyl residue or a phenyl residue.

Preferred alkyl(meth)acrylic ester monomers copolymerizable with the above-described OCP macromonomer have the following formula II $$CH_2=\overset{R'}{\overset{|}{C}}-\overset{O}{\overset{\|}{C}}-OR_2 \qquad (II)$$

wherein

R' is hydrogen or methyl, and $R_2$ is an alkyl residue with 1 to 26 carbon atoms.

Particularly preferred OCP macromonomers are compounds of general formula (I) wherein segments [A] and/or [A'] are derived from butadiene or isoprene (2-methyl-,1,3-butadiene) and having the following formula I-A $$C_4H_9-[(CH_2)_4]_{n'}-[CH_2-\underset{C_2H_5}{\underset{|}{CH}}]_{m'}-CH_2CH_2-O-\overset{O}{\overset{\|}{C}}-\underset{R}{\underset{|}{C}}=CH_2 \qquad (I\text{-}A)$$

wherein

R is hydrogen or methyl, n' is an integer of from 0 to 3,000, and m' is an integer of from 0 to 3,000, provided that n'+m' equals at least 10, $m' \geqq n'$ and $n'+m' \leqq 3{,}000$.

Furthermore, segments [A] or [A'] derived from styrene and styrene derivatives, e.g. alkyl styrenes, in particular methyl-substituted styrenes, are also of interest.

Examples of preferred comonomers of formula II are methylmethacrylate, butylacrylate, butylmethacrylate 2-ethylhexylacrylate, a mixture of n-C6-C10-alkylmethacrylates (from the commercial product LINCOL® by Condea), and a mixture of C12–C15-alkylmethacrylates (from commercial product DOBANOL® 25 L by Shell Hamburg).

Other suitable monomers for copolymerization with the invention OCP macromonomers in addition to those of formula II include radically polymerizable monomers containing functional groups, particularly those whose dispersion/detergent activity in oil additives is known, e.g., compounds of formula III

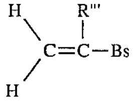

III wherein R''' stands for hydrogen or methyl and Bs stands for a 5- or 6-member heterocyclic ring or the residue:

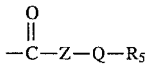

where Z is oxygen or —NR4, and Q is an optionally alkylated hydrocarbon bridge having a total of 2 to 50 carbon atoms which may be interrupted by ether linkages, preferably 2 to 6 carbon bridge members, and $R_5$ is —$OR_6$ or —$NR_7R_8$, wherein $R_6$ is hydrogen or an alkyl residue with 1 to 24, preferably 8 to 22 carbon atoms or an alkyl-substituted aryl residue, particularly a phenyl residue with one or more C1–C18-alkyl substituents, preferably one or more C6–C16-alkyl substituents, and wherein $R_7$ and $R_8$ each are an alkyl residue with 1 to 6 carbon atoms or together form, with the nitrogen and potentially other hetero-atoms, a heterocyclic 5- or 6-membered ring, and wherein $R_4$ is hydrogen or an alkyl residue with 1 to 6 carbon atoms. In addition to nitrogen, heteroatoms also include oxygen and/or sulfur. Examples of preferred heterocyclic rèsidues are imidazoles, lactams, carbazoles, vinylcarbazoles and vinylimidazoles.

The content of radically polymerizable monomers having functional groups in the invention comb polymers ranges from 0 to 25% by weight, preferably 0.5 to 25%, particularly 2 to 20% by weight, based on the total monomer weight.

Preferred comb polymers according to the invention are copolymers comprising 5 to 80 wt % OCP macromonomers of formula I and/or formula IA, preferably 10 to 50 wt %, and 90 to 50 wt % of alkyl (meth) acrylic ester monomers of formula II. Optionally, 0–25 wt %, preferably 0.8–20 wt % based on the total monomer content, of monomers of compound III can be used to produce the invention comb polymer. Of course, mixtures of each of the above monomer types can be used in preparing an invention comb polymer. With regard to formula I preferred n and m values range from 10 to 1,000, and preferred (n+m) values range from 10 to 2,00.0. For formula I-A, preferred n' and m' values range from 10 to 1,000, and preferred (n'+m') values range from 10 to 2,000. Preferred overall apparent molecular weights $M_W$ of the invention comb polymers are from 10,000 to 500,000, preferably 20,000 to 300,000 as measured by size exclusion chromatography based on a PMMA calibration.

Macromonomers of formula I may be prepared using any known process, and one process is explained below using optionally substituted butadiene. As shown below, the compound of formula IV is produced in an anionic polymerization step, preferably with butyl lithium in a suitable inert solvent L, such as toluene, hexane, cyclohexane, THF, as well as their mixtures, while terminating the polymerization with ethylene oxide:

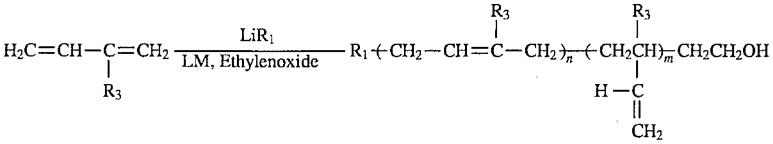

(IV)

wherein $R_3$ stands for hydrogen or an alkyl residue with 1 to 6 carbon atoms, and n, m, and $R_1$ have the above meanings.

The compound of formula IV can be hydrogenated in any known manner if desired, e.g., by catalytic hydrogenation with hydrogen, preferably with a palladium catalyst under pressure (30–150 atmospheres), yielding a saturated alcohol of formula V:

(IV)

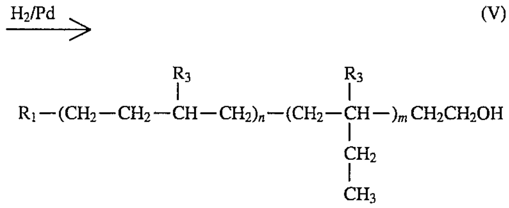

(V)

The compounds of formula I or IA can then be produced in any known manner from compounds IV or V, e.g., by reaction with an activated (meth)acrylic acid derivative of formula VI

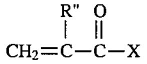

(VI)

wherein X stands for Cl or a residue:

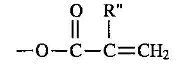

where R" is hydrogen or methyl, or by reesterification with a (meth)acrylate, preferably in the presence of at least one polymerization inhibitor, e.g., from the class of sterically inhibited phenols, usually in amounts from 0.1 to 1% by weight, based on the compounds of formula IV or V. See H. Rauch-Puntigam, Acryl- und Methacrylverbindungen, Springer-Verlag 1968, Ullmann's Encyclopedia of Industrial Chemistry 5th Ed. Vol. A20, pg 461–475 VCH 1992; R. Gaechter, H. M. Müller, Handbuch der Kunststoffadditive, Hanser Verlag, 1979 incorporated herein by reference.

The conversion to compounds of formula I or IA is preferably performed such that the compound of formula IV or V is placed in a (water-immiscible) inert solvent, such as, e.g., methyl-tert.-butylether or an aromatic solvent, such as toluene, and agitated, preferably in the presence of an acid acceptor, such as pyridine, triethylamine, and is left to react with a compound of, e.g., formula VI over a specific period of time, e.g. 12–24 hours at 25° C. Processing continues by precipitation of the product with ethanol (ratio of solvent/precipitant approximately 1:10). The macromonomers of formula I or IA can also be produced according to U.S. Pat. No. 5,254,632, incorporated herein by reference, by reesterification.

By using the process described above, the molecular weights, distributions, and microstructure of macromonomers of formula I and IA can be specifically adjusted. In addition, good terminal group functionality ($f_{OH,MMA}$>90%) is achieved.

The following process also can be used for producing macromonomers of formula I or IA. Anionic polymerization of, e.g., butadiene with lithium-organic compounds is well known in the art (see H. P. Mark et al. Encyclopedia of Polymer Science & Engineering 2nd Ed. Vol. 2, 562–567, J. Wiley 1985, Houben-Weyl, Methoden der Organischen Chemie Vol. XIV/1, p. 643–660, Georg Thieme 1961 incorporated herein by reference). Butyl lithium in heptane, whereby 40–50% of trans- and cis-, and approximately 5–10% of vinyl compounds are formed, can be used to accomplish polymerization of the diene. The reaction may be performed, e.g., in absolute toluene to which is added a solution of butyl lithium, e.g., n-butyl lithium or sec. butyl lithium, as well as a regulator, e.g., tetrahydrofuran, necessary for regulating the microstructure to the desired range. The diene is usually condensed with cooling, e.g., in the range from −20° to 0° C. After cooling is stopped and room temperature has been reached, reaction usually takes place exothermally. In the case of the butadiene, temperature peaks of up to 80° C. are reached. In many cases it is recommended that approximately an hour of heating follow in order to complete the reaction; 60° C. is given as a reference value. The solution may then be cooled to e.g. −5° C. and ethylene oxide, e.g., in tetrahydrofuran, is metered in to stop chain propagation. The reaction with ethylene oxide results in chain termination:

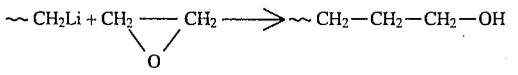

As a rule, completion of the reaction follows, e.g. for approximately 20 hours. For further processing, acidification, e.g., with concentrated hydrochloric acid, follows, preferably under an inert gas, such as argon, and is then followed by washing with water for neutralization; any emulsion that forms is countered by adding suitable breaking agents, e.g., ether or sodium chloride. The compounds of formula IV produced in this manner can be further processed by, e.g., being dried over magnesium sulfate, subsequent filtration, and concentration in a rotary evaporator. The subsequent drying of the residues may take place, e.g., in the vacuum dryer at room temperature.

The desired microstructure thus can be adjusted by anionic polymerization of the diene with a lithium-organic compound as initiator in a suitable solvent, such as toluene, with metering in of defined amounts of tetrahydrofurane (THF). The required amount of THF depends on the molecular weight, since the desired structure ratio is obtained with a molar THF/initiator ratio of 3:1 to 1:1.

If the heterogenic hydrogenation of compounds according to formula IV into the saturated alcohols of formula V is desired, the conversion can be performed according to any known process, preferably in a high pressure autoclave (with agitator and heater) in a suitable liquid medium, such as THF and in the presence of a metallic hydrogenation catalyst, such as, e.g., palladium, preferably on a calcium carbonate carrier. It is advantageous that 5–20% wt/wt polymer solutions in THF and—as a reference—a hydrogen pressure of 50 bar are used. It was found that, following an observed drop in pressure and on reaching a constant temperature, heating, e.g., to 120° C., and hydrogenation over a specific time, e.g., 18 hours, is practical. Further processing is performed in the usual manner.

The acylation of the alcohols according to formula IV or V to produce OCP (meth)acrylates of formula (I) or (IA) can be performed with the usual activated (meth)acrylic acid derivatives, such as, e.g., compounds of formula VI. The reaction typically is performed in a suitable container, e.g., a round-bottom three-neck flask with reflux cooler (calcium chloride pipe), magnetic agitator, and internal thermometer. The reaction usually is allowed to occur in the presence of an acid acceptor, e.g. triethylamine. Usually the polymers are provided dissolved in a suitable inert solvent, e.g. diethylether (approximately 10%), and an acid acceptor is added, usually with a 10% molar ratio excess of the compound of formula VI. With agitation, the compound of formula VI, preferably methacrylic acid chloride, is added to compound IV or V in an equimolar ratio. Addition of a polymerization inhibitor is recommended (see H. Rauch-Puntigam, Th. Völker, Chemie der Acryl- und Methacrylverbindungen, Springer-Verlag 1967 incorporated herein by reference), e.g., of the hydroquinone derivative type, such as, e.g., hydroquinone monomethylether in ppm amounts; 50 ppm is given as a reference. The reaction is allowed to occur over a period of, e.g. 18 hours, at room temperature. Further processing is accomplished by filtering off the precipitated salt, e.g. the triethylammonium hydrochloride, subsequent washing of the organic phase with water for neutralization, precipitation of compound I with e.g. methanol, or concentration on the rotary evaporator, and drying.

The copolymerization of monomers of formulas I or IA with monomers of formula II and optionally with monomers III may be performed, e.g., as a radical-induced solvent polymerization in any known manner (see H. Rauch-Puntigam, Th. Völker, Acryl-und Methacrylverbindungen loc.cit.). Smaller batches can be performed, e.g., in a bent-tube vessel. For larger batches a reactor with agitator, gas entry device, and heater is used. The macromonomer of formula I and/or IA and the monomer formula II are dissolved in a suitable inert solvent L, such as, e.g., toluene, xylene, so that approximately 50% solutions are obtained. In a typical batch, the monomer components are used in a weight ratio of 1:1. Degasification is achieved by adding dry ice or by introducing nitrogen for approximately 10 minutes. Practically, this is followed by heating until the polymerization temperature is reached, e.g., to 77° C., and an initiator is added, e.g., as a 1% solution in the reaction solvent. Suitable initiators are any known initiators, e.g. azo-initiators, such as azo-bis-isobutyronitrile (AIBN), also peroxy-compounds in the usual amounts, e.g. 0.1 to 1% by weight related to the monomers. The initiator can be replenished at specific intervals, e.g. after 4 and after 6 hours. The total polymerization time usually lasts about one day. The formed comb polymer can be further washed, processed, etc. with a precipitant, e.g. methanol.

The advantages of comb polymers according to the invention include their particularly favorable low temperature behavior when used as oil additives. Any oil can be used, including motor oil, hydraulic oil, silicone oil, mineral oil, gear oil, etc. A comb polymer with a 10–20% by weight Formula I macromonomer content and 80–90% by weight alkyl(meth)acrylate (formula II) content with C1–C10 alkyl esters as viscosity index improvers has a shear stability index SSI=20, with a viscosity index >300, and a thickening effect at − 25° C. of 1.5 ($\eta_{rel}$=1.5). Suitable choice of comonomers and/or process parameters permits production of comb polymers with a largely homogeneous distribution of lateral branches. The advantages of those macromonomers is also present in representatives having a relatively high molecular weight (overall number average MW of 5,000 to 100,000). It was found that macromonomers of formula I can be copolymerized to produce copolymers having a molecular weight (Mn) of approximately 150,000 g/mol in concentrated solution with alkyl (meth) acrylates, e.g. those of formula II.

With a specific dependence on the molecular weight of the macromonomers of formula I, the monomer composition of the comb polymers, and their apparent molecular weight, the invention comb polymers provide excellent thickening products which are typically more effective than PAMA by a factor of 1.5–2 in the shear stability range SSI=10–20.

The following examples serve to further explain the invention. The invention is not limited to the examples, however.

EXAMPLES

The shear stability index SSI is determined according to ASTM 2603. The viscosity index VIB is determined according to DIN 51564 / ISO 2909.

The apparent molecular weight $M_W$ is determined by size exclusion chromatography (SEC) with PMMA calibration (see Ullmann's Encyclopedia of Industrial Chemistry 5th Ed. Vol A 20, 520–533, VCH 1992).

The non-uniformity U is obtained according to the formula $$U=(M_W/M_n)-1$$

The solution properties are determined in a capillary viscosimeter according to ASTM-D 445. (In PAO 4 as a solvent between 100° and −20° C.) The quotient ηsolution/ηsolvent=$\eta_{rel}$ (=relative viscosity) is given as a measure of thickening effect, if, as has not been noted additionally, KV (100) was set to 12.1+0.1 $mm^2/s$ in PAO 4/KV (100)=3.88 $mm^2/s$).

A General Production of Macromonomers of Formula I

A-1:

Anionic Polymerization To Form a Compound of Formula IV

Under inert conditions, approximately 1,200 ml of toluene are distilled over benzophenone/sodium directly into the reaction vessel. To this is added an initiator by way of gas-tight syringe, e.g., a 12% solution of n-butyl lithium in n-hexane, and absolute tetrahydrofuran as regulator. Then butadiene was dried over dibutylmagnesium and condensed initially at −20° C., then at 0° C. into the reaction vessel. The cooling bath was removed after butadiene condensation was concluded. Following heating to room temperature, the batches react mostly exothermally. Temperatures of up to 80° C. are reached. To complete polymerization, most of the batches are heated for approximately 30 to 60 minutes at 60° C.

OH termination was achieved with ice water cooling to <5° C. and metering in a solution of ethylene oxide in tetrahydrofuran. The reaction is allowed to continue for approximately another 20 hours at room temperature. A sample may be removed prior to addition of the ethylene oxide, in order to determine the molecular weight of the non-functionalized material.

The batches are further processed by being subjected to pressure under argon gas, acidification with concentrated hydrochloric acid, neutralization by washing with water (whereby ether or sodium chloride is added if emulsions form), drying over magnesium sulfate, filtering, concentration in the rotary evaporator, and drying of the residues in the vacuum dryer at room temperature.

The desired microstructure is set in the case of anionic polymerization of butadiene with n-butyl-lithium or sec. butyl-lithium as initiator in toluene as solvent, by metering in defined amounts of tetrahydrofuran as regulator. The required amount of tetrahydrofuran thus corresponds to the desired molecular weight. The desired structure (i.e., n, m and n+m) ratio is achieved with a molar ratio of tetrahydrofuran: initiator of 1: 1 to 3: 1.

A-2:

Hydrogenation of the Hydroxy-Terminated Polybutadiene IV to Form Compounds of Formula V. The hydrogenation can be executed e.g. in a 2 liter high pressure autoclave with agitator and heater.

Conditions:

Pressure: 50 bar $H_2$

Temperature: 120° C.

Duration: 18 hours

Agitation: 1,200 rpm

Catalyst: Palladium on calcium carbonate carrier (Pd)

First 5–10% (weight) polymer solutions in tetrahydrofuran are placed in the autoclave. Repeated flushing with 10 bar nitrogen follows, then 50 bar hydrogen is added. A drop in pressure (to approximately 20 bar) occurs after a few minutes (approximately 5 minutes). After the pressure becomes constant, heating to 120° C. follows, and this temperature is maintained for 18 hours. For further processing, the (black) batch solutions of dispersed catalyst powder were centrifuged or filtered under pressure; the clear solutions were concentrated in the rotary evaporator, and the residues were dried in vacuum at 80° C.

A-3:

Acylation of the Hydroxy-Terminated Hydrogenated Polybutadienes of formula V with Methacrylic Acid Chloride to Form Compounds of Formula I.

The Compounds of formula V can be converted in a round-bottom three-neck flask with reflux cooler with attached calcium chloride pipe, magnetic agitator, and internal thermometer. The polymers are provided in absolute dietheylether (10% by weight), and triethylamine is added. Then methacrylic acid chloride is added at room temperature in a molar ratio excess of 10%, whereby the solutions become turbid. The observed heat tonality is between 1° and 3° C. For stabilization hydroquinone monomethylether (50 ppm) is added to the batch, and the reaction is allowed to occur for a total of 18 hours at room temperature. Further processing consists of the filtering off of the precipitated triethylamine hydrochloride, neutralization by washing with water, and precipitation of the macromonomer with methanol or concentration in a rotary evaporator, and the drying of the residue in a vacuum dryer at room temperature. Macromonomers of formula I produced are summarized in Table 1.

TABLE 1

| | Characterization of the compounds of formula I | | | | |
|---|---|---|---|---|---|
| Name | $M_n$, calculated | *$M_W$ SEC | U** | $f_{OH}$*** | $f_{MMA}$ |
| I-1 | 1,000 | 2,490 | 0.07 | 0.98 | 1.0 |

TABLE 1-continued

| Characterization of the compounds of formula I | | | | | |
|---|---|---|---|---|---|
| Name | $M_n$, calculated | *$M_W$ SEC | U** | $f_{OH}$*** | $f_{MMA}$ |
| I-2 | 5,000 | 9,100 | 0.07 | 0.94 | 0.95 |
| I-3 | 10,000 | 29,000 | 0.04 | 0.88 | 0.90 |
| I-4 | 40,000 | 148,000 | 0.19 | 0.95 | — |

*SEC = size exclusion chromatography with PMMA calibration
**U = non-uniformity
***f = functionality characterized by HPLC; maximum value = 1

B. General Production Method for Comb Polymers

Equipment: For 100 g batches, a 250 ml four-neck swan flask, a KPG sabre agitator, a thermometer, a reflux cooler, a gas entry pipe for nitrogen, an oil bath heater were used. For smaller batches (e.g. 10–20 g), bent-tube vessels consisting of a cylindrical glass container (length 20 cm, diameter 3 cm) with cock and rubber septum for magnetic agitation are used.

| Polymerization<br>Batch: Total 100 g, 50% in toluene, of | |
|---|---|
| macromonomer of formula I | = 25 g |
| monomer of formula II | = 25 g |
| 2,2'-azo-bis-(isobutyronitrile), 1% in toluene | = 15 g |

The macromonomer of formula I and the comonomer of formula II are provided in 50% solution in toluene. Degasification is achieved by addition of dry ice or 10 minutes of nitrogen introduction. After reaching polymerization temperature (approximately 77° C.), ⅔ of the 1% initiator solution (2,2'-azo-bis-(isobutyronitrile) in toluene) is added. After 4 to 6 hours, the final ⅓ of the initial initiator solution is added. The total polymerization time is 24 hours.

Isolation of Comb Polymers

After a sample (approximately 2 g) has been removed for analysis, the batch is precipitated with approximately 1 liter of methanol, and the residue is dried for 24 hours at 80° C. in a vacuum dryer. The solution properties were determined as described above with a capillary viscosimeter according to ASTM-D 445.

Using the general production method above, the following comb polymers were produced:

Example KP-1

Copolymer produced from 40% by weight 2-ethylhexylacrylate, 40% by weight butylacrylate, and 20% by weight macromonomer with the formula I-2: $M_W$=294,000 g/mol and U=2.8; VIB=300 (8.2% in PAO 4), residual macromonomer content=3.6%.

Example KP-2

Copolymer produced from 50% by weight 2-ethylhexylacrylate, 40% by weight butylacrylate, and 10% by weight macromonomer with the formula I-2: $M_W$=299,000 g/mol and U=3.8; VIB =339 (8.7% in PAO 4).

Example KP-3

Copolymer produced from 60% by weight n-C6–C10-alkylmethacrylate (LINCOL® 610), 20% by weight butylmethacrylate, and 20% by weight macromonomer with the formula I-3: $M_W$247,000 g/mol and U=1.66; VIB=260 (6.7% by weight in PAO 4).

Example KP-4

Copolymer produced from 50% by weight n-C6–C10-alkylmethacrylate, 30% by weight butylmethacrylate, and 20% by weight macromonomer I-3: $M_W$=235,000 g/mol and U=1.76; VIB=287 (7.0% by weight in PAO 4).

Example KP-5

Copolymer produced from 50% by weight n-C6–C10-alkylmethacrylate, 40% by weight butylmethacrylate, and 10% by weight macromonomer I-3: $M_W$=222,000 g/mol and U=1.45; VIB=318 (8.0% by weight in PAO 4).

Example KP-6

Copolymer produced from 40% by weight methylmethacrylate and 60% by weight macromonomer I-1: $M_W$=119,000 g/mol; U = 8.

Example KP-7

Copolymer produced from 20% by weight methylmethacrylate and 80% by weight macromonomer I-1: $M_W$=171,000 g/mol; U = 9.

Example KP-8

Copolymer produced from 40% by weight butylacrylate and 60% by weight macromonomer I-2: $M_W$=325,000 g/mol; U=4; VIB=284 (5.9% by weight in PAO 4).

Example KP-9

Copolymer produced from 40% by weight methylmethacrylate and 60% by weight macromonomer I-4: $M_W$=269,000 g/mol; U=5,9; VIB=196 (3.5% by weight in PAO 4).

Control Examples Without Macromonomers of Formula I

Example V-1

Poly-n-decylmethacrylate $M_W$=266,000 g/mol; U=2.22; VIB=260 (7.0% by weight in PAO 4).

Example V-2

Homopolymer of a C12-C15-alkylmethacrylate (from DOBANOL® 25 L) $M_W$=274,000 g/mol; U=1.59; VIB=227 (7.7% by weight in PAO 4).

Example V-3

Copolymer of 85% by weight C12–C15-alkylmethacrylate (from DOBANOL® 25 L) and 15% by weight methylmethacrylate.

The $\eta_{rel}$ and SSI properties of the products are shown in the following table. Relative viscosities of ($\eta_{rel}$) the comb polymers and comparative linear PMMAs, determined in PAO 4 in a temperature range from −20° C. to 100° C. with a kinematic solution viscosity of 12.1 mm²/s at 100° C.

TABLE 2

| | Conc. | | $\eta_{rel}$ at | | | | | |
|---|---|---|---|---|---|---|---|---|
| Expl. | (Wt. %) | 100° C. | 40° C. | 0° C. | −10° C. | −20° C. | SSI | (ASTM 2603) |
| KP-1 | 8.2 | 3.09 | 2.44 | 1.95 | 1.85 | 1.55 | 21.0 | |
| KP-2 | 8.7 | 3.11 | 2.19 | 1.82 | 1.62 | 1.57 | 22.7 | |
| KP-3 | 6.7 | 3.11 | 2.81 | 2.35 | 2.22 | 2.05 | 23.2 | |
| KP-4 | 7.0 | 3.05 | 2.51 | 2.27 | 2.16 | 2.00 | 19.8 | |
| KP-5 | 8.0 | 3.05 | 2.27 | 2.03 | 1.92 | 1.82 | 18.9 | |
| KP-6 | 5.0* | 1.60 | 1.59 | 1.91 | 1.79 | 1.73 | n.d. | |
| KP-7 | 10.9* | 2.18 | 2.02 | 2.44 | 2.33 | 2.42 | n.d. | |
| KP-8 | 5.9 | 3.10 | 2.60 | 2.40 | 2.35 | 2.25 | 21.2 | |
| KP-9 | 3.5 | 3.06 | 3.56 | 4.41 | 4.43 | 4.56 | 20.5 | |
| V-1 | 7.0 | 3.10 | 2.80 | 2.59 | 2.62 | 2.40 | 32.3 | DIN 51382 |
| V-2 | 7.7 | 3.14 | 3.24 | 3.39 | 3.29 | 3.15 | 29.3 | DIN 51382 |
| V-3 | 9.5 | 3.10 | .2.80 | 2.70 | 2.60 | 2.70 | 7.0 | |

*KV (100) < 12.1 $mm^2/s$

We claim:

1. Comb polymers comprising an olefin copolymer macromonomer of formula I:

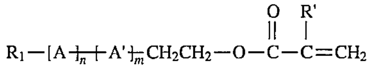

(I)

wherein

R' is hydrogen or methyl, $R_1$ is a linear, branched or cyclic $C_2$–$C_8$ alkyl group or a $C_{6-C10}$ aryl group,

[A] is a segment formed by the 1,4-addition of butadiene optionally substituted with a C1–C6 alkyl group,

[A'] is a segment formed by the vinyl addition of butadiene optionally substituted with a C1–C6 alkyl group, and n+m is an integer of from 10 to 3,000, copolymerized with alkyl(meth)acrylic ester monomers of formula II

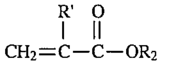

(II)

wherein

R' is hydrogen or methyl, and $R_2$ is an alkyl group with 1 to 26 carbon atoms.

2. Comb polymers as claimed in claim 1, wherein in addition to the alkyl(meth)acrylic ester monomers of formula II, monomers of formula III

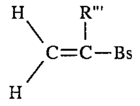

III wherein R''' is hydrogen or methyl and Bs is a heterocyclic 5- or 6-member ring or a residue

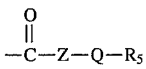

wherein Z is oxygen or —NR4, Q is an optionally alkylated hydrocarbon bridge with a total of 2 to 50 carbon atoms which may be interrupted by ether linkages, $R_5$ is —$OR_6$ or —$NR_7R_8$, wherein $R_6$ is hydrogen or an alkyl residue with 1 to 24 carbon atoms or an alkyl-substituted aryl residue with C1–C18-alkyl substituents, and wherein $R_7$ and $R_8$ each are an alkyl residue with 1 to 6 carbon atoms or together form, with the nitrogen atom and optionally other hetero-atoms, a heterocyclic 5- or 6-member ring, and wherein $R_4$ is hydrogen or an alkyl residue with 1 to 6 carbon atoms, are also copolymerized with said olefin copolymer macromonomers in amounts from 0.5 to 25% by weight based on the total weight of all monomers.

3. Comb polymers as claimed in claim 1, wherein said olefin copolymer macromonomer has the formula I-A:

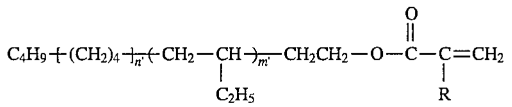

(I-A)

wherein

R is hydrogen or methyl, n' is an integer of from 0 to 3,000, and m' is an integer of from 0 to 3,000, with the condition that n'+m' equal at least 10, and m' ≧n'.

4. Comb polymers as claimed in claim 2, wherein said olefin copolymer macromonomer has the formula I-A:

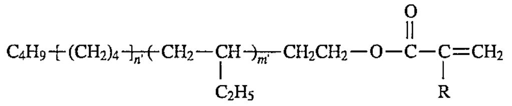

(I-A)

wherein

R is hydrogen or methyl, n' is an integer of from 0 to 3,000, and m' is an integer of from 0 to 3,000, with the condition that n'+m' equal at least 10, and m' ≧n'.

5. Macromonomers of formula I-A

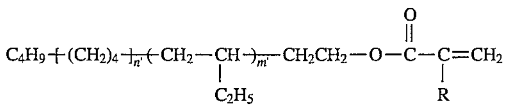

(I-A)

wherein

R is hydrogen or methyl, n' is an integer of from 0 to 1,500, m' is a non-zero integer greater than or equal to n, and n'+m' is an integer of at least 10.

6. An oil composition comprising oil and the comb polymer of claim 1.

7. An oil composition comprising oil and the comb polymer of claim 2.

* * * * *